United States Patent
Lee et al.

(10) Patent No.: US 6,225,908 B1
(45) Date of Patent: May 1, 2001

(54) DOUBLE-LAYER CONTAINER EQUIPPED WITH TEMPERATURE WARNING DEVICE

(76) Inventors: Shu-Finn Lee, No.323-6, Section1, Jong Shan Road, Changhua; Chih-Lun Chen, 6F-2, No.73, Shanq ming 1st Street, Shi twen zone, Taichung, both of (TW)

( * ) Notice: Subject to any disclaimer, the term of this patent is extended or adjusted under 35 U.S.C. 154(b) by 0 days.

(21) Appl. No.: 09/572,075

(22) Filed: May 17, 2000

(51) Int. Cl.[7] .................................................. G08B 17/00
(52) U.S. Cl. ................. 340/586; 340/384.7; 340/691.3; 340/691.6; 340/692; 340/693.5; 340/815.45
(58) Field of Search ................................... 340/584, 586, 340/593, 691.1, 691.3, 691.4, 691.5, 691.6, 692, 693.5, 693.9, 815.45, 384.7

(56) References Cited

U.S. PATENT DOCUMENTS

| | | | |
|---|---|---|---|
| 5,000,581 | * | 3/1991 | Yata et al. ............................. 340/586 |
| 5,132,668 | * | 7/1992 | Lee ....................................... 340/584 |
| 6,069,566 | * | 5/2000 | Guata ................................... 340/586 |

* cited by examiner

Primary Examiner—Daniel J. Wu
(74) Attorney, Agent, or Firm—Rosenberg, Klein & Lee

(57) ABSTRACT

A double-layer container equipped with temperature warning device comprises a double-layer container and a temperature sensor device, wherein the temperature sensor device is disposed in a segregated store space formed at the bottom end of the double-layer container for detecting temperature of food or soup loaded in the container. A detected signal is transmitted from a temperature sensor to a microprocessor for judging to lighten a specified LED and meanwhile drive a speaker to play a corresponding song or rhythm for easy discrimination of the temperature range of the food or the soup and thereby to protect a user against being scalded.

3 Claims, 3 Drawing Sheets

DOUBLE-LAYER CONTAINER EQUIPPED WITH TEMPERATURE WARNING DEVICE

BACKGROUND OF THE INVENTION

1. Field of the Invention

This invention relates generally to a container equipped with temperature warning device, more particularly, it relates to a double-layer container equipped with temperature warning device, wherein a temperature sensor device is used to detect temperature of hot food or hot soup loaded in the double-layer container for protecting people against being scalded when temperature is unbearable high.

2. Description of the Prior Art

As it is nothing rare that a user is scalded occasionally by carelessness when using a conventional single-layer container, a cup for example, loaded with hot liquid, therefore, a double-layer container for avoiding the user's hand touching the hot layer directly is substituted for the single-layer. However, the user may not be scalded again at his hand by a hot container wall, he may be scalded at his lip this time for being misled to mistake that the inside liquid is warm.

For reducing the possibility of the abovesaid unnecessary impairment and for ascertaining the right time to enjoy the food, a temperature display or warning device seems a feasible measure worthy of consideration.

SUMMARY OF THE INVENTION

The primary object of this invention is to provide a double-layer container equipped with temperature sensor device, wherein a temperature sensor device is arranged in bottom end of a double-layer container for detecting temperature of food or soup loaded in the container to protect a user against being scalded.

Another object of this invention is to provide a double-layer container with temperature warning device, wherein different warning lights and corresponding songs are presented to indicate different temperature ranges.

In order to realize abovesaid objects, a double-layer container with temperature warning device of this invention comprises a double-layer container and a temperature sensor device. The temperature sensor device is disposed in a segregated space in the bottom end of the double-layer container and is composed of a microprocessor, a temperature sensor, and a warning device, wherein the warning device further comprises a plurality of LEDs in different colors and a speaker. The temperature sensor is attached onto an outside face at the bottom end of the double-layer container for detecting temperature of food or soup loaded in the container. A detected signal is transmitted from the temperature sensor to the microprocessor for judging to lighten a specified LED and drive the speaker to play a corresponding song for easy discrimination of the temperature range and thereby to protect a user against being scalded.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention to be made later are described briefly as follows in which.

DETAILED DESCRIPTION OF THE PREFERRED EMBODIMENT

Figure 1:
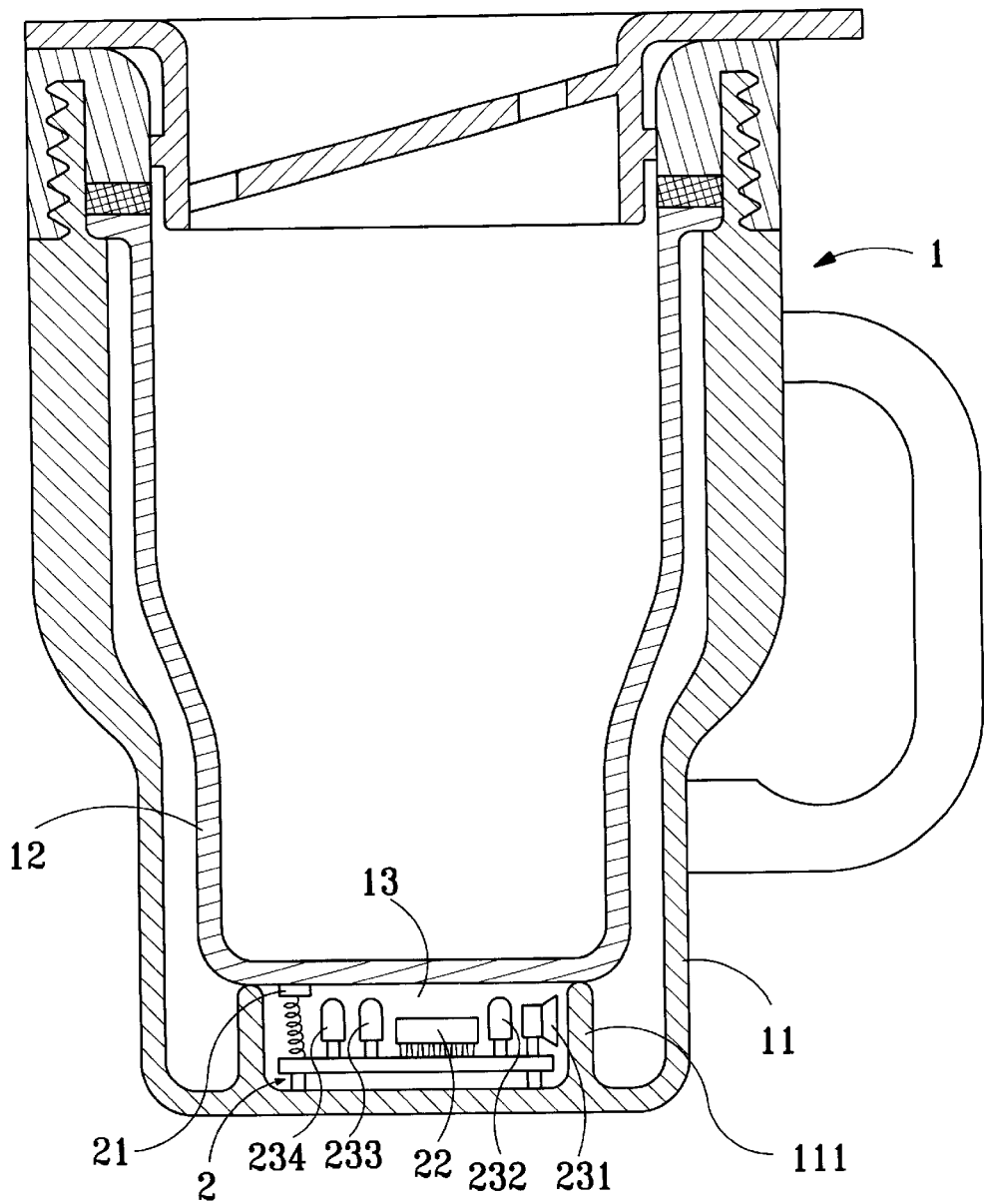
FIG. 1 is a schematic disposition view of a double-layer container equipped with temperature warning device of this invention.
Figure 2:
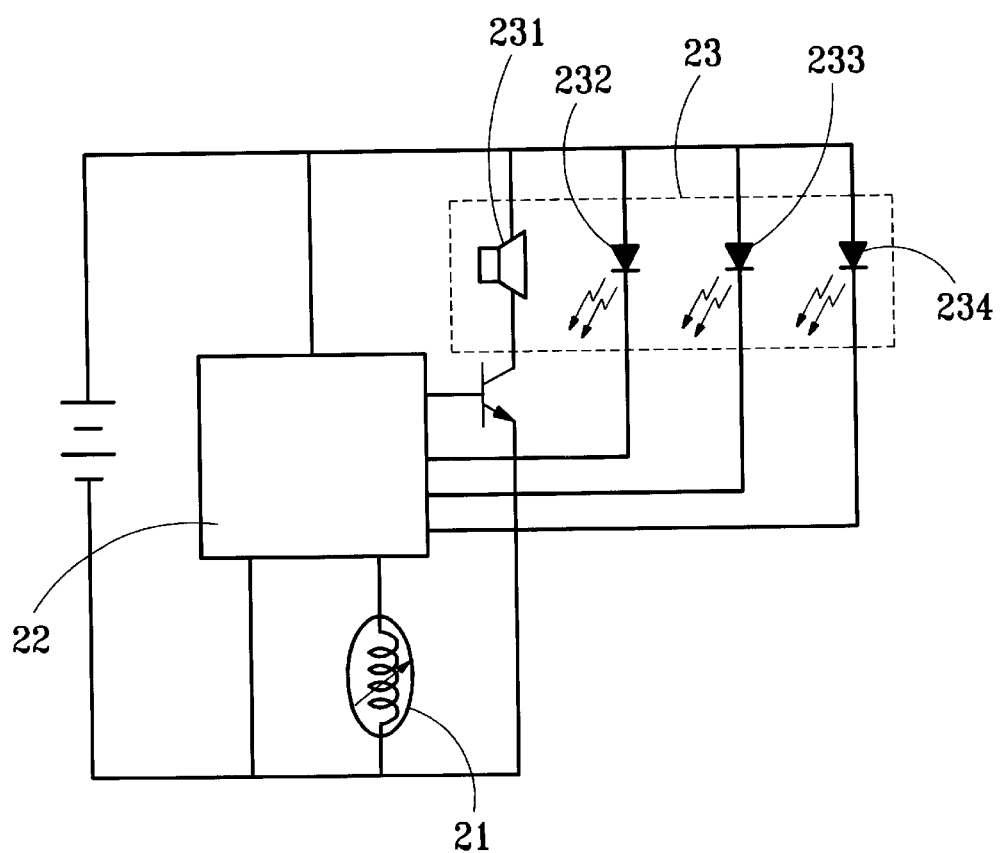
FIG. 2 is a circuit diagram of the double-layer container equipped with temperature warning device of this invention.

As shown in FIG. 1, a double-layer container equipped with temperature warning device of this invention comprises a double-layer container 1 and a temperature sensor device 2.

The double-layer container 1 is composed of an internal lining container 12 and an external container 11, wherein a circular flange 111 is disposed on an inner bottom face of the external container 11 so that a store space 13 is formed when the internal lining container 12 is embedded in the external container 11 and propped by the flange 111.

The temperature sensor device 2 disposed in the store space 13 formed at the bottom end of the double-layer container 1 comprises a temperature sensor 21, a microprocessor 22, and a warning device 23, wherein the temperature sensor 21 may be a thermistor; and, the warning device 23 further comprises a speaker 231, a red, a yellow, and a green LED (light-emitting diode) 232, 233, 234.

The temperature sensor 21 is attached on the outside bottom end of the internal lining container 12 for detecting temperature of inside food or soup, and the detected signal is transmitted to the microprocessor 22. Then, the microprocessor 22 is supposed to drive and lighten one of the LEDs 232, 233, 234 according to the received signal, and meanwhile, drive the speaker 231 to play a song so that the user is informed of the temperature range of the inside food or soup.

The temperature range of the LEDs are specified as the following:

1. 80~100° C. for the red LED 232;
2. 60~80° C. for the yellow LED 233; and
3. 40~60° C. for the green LED 234.

Figure 3:
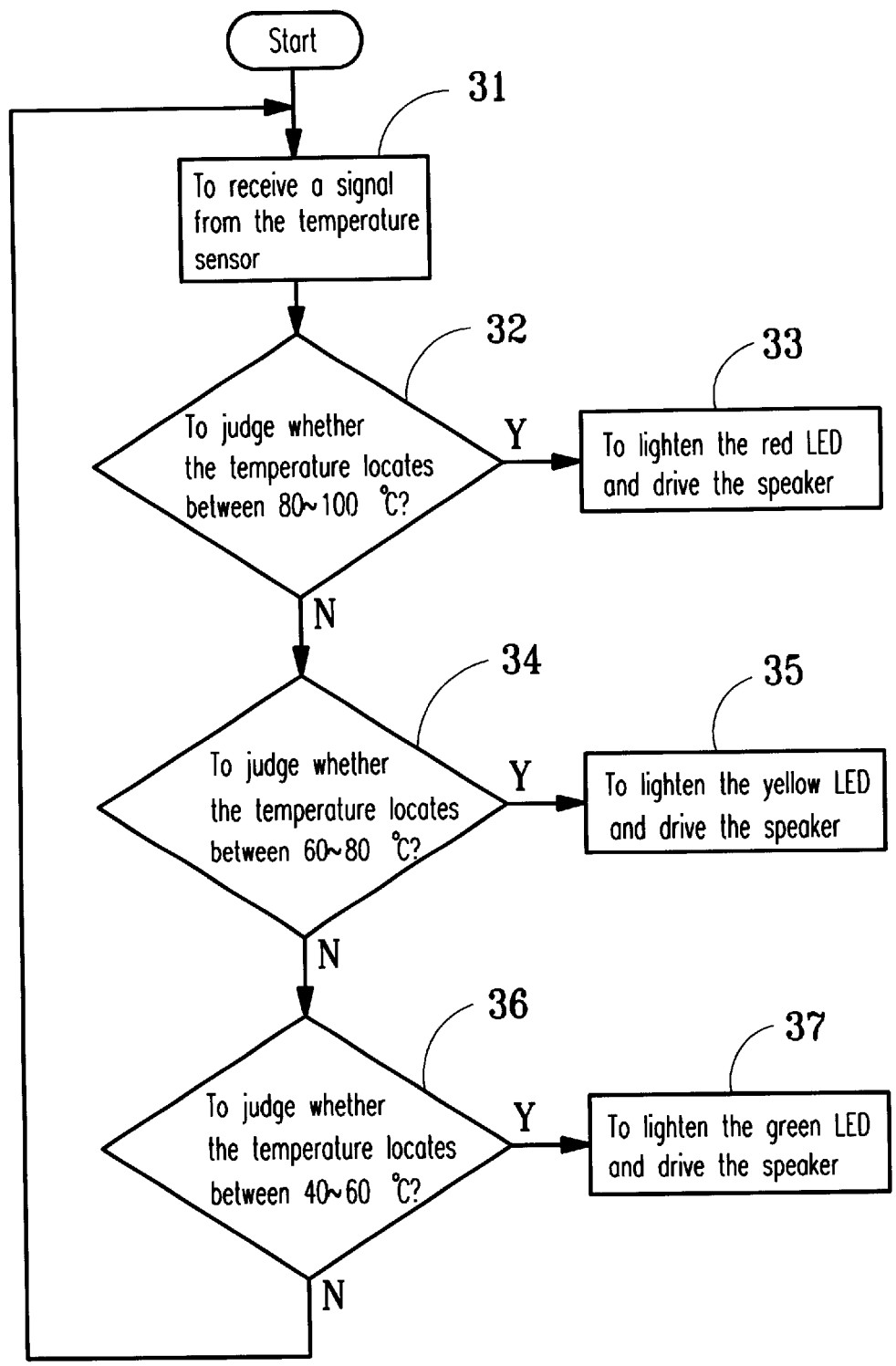
FIG. 3 is an action chart of a microprocessor of this invention.

Referring to an action chart of the microprocessor 22 of this invention shown in FIG. 3, when a signal (31) from the temperature sensor 21 is received, the microprocessor 22 will judge whether the temperature locates between 80~100° C. (32)? If positive, the microprocessor 22 lightens the red LED 232 and drives the speaker 231 to play a corresponding song (33); otherwise, judge whether it locates between 60~80° C. (34)? If positive, the microprocessor 22 lightens the yellow LED 233 and drives the speaker 231 to play another corresponding song (35); otherwise, judge whether it locates between 40~60° C. (36)? If positive, the microprocessor 22 lightens the green LED 234 and drives the speaker 231 to play yet another corresponding song (37); otherwise, returns to stand-by state.

The merits of this invention may be summarized below:

1. A temperature sensor device is arranged in a segregated space in bottom end of a double-layer container, and used for detecting temperature of food or soup loaded in the container to protect a user against being scalded.
2. Different warning lights and corresponding songs are presented to indicate different temperature ranges.

Although, this invention has been described in terms of preferred embodiments, it is apparent that numerous variations and modifications may be made without departing from the true spirit and scope thereof, as set forth in the following claims.

What is claimed is:

1. A double-layer container equipped with temperature warning device, comprising:

a double-layer container composed of an internal lining container and an external container, wherein a circular flange is disposed on an inner bottom face of said external container so that a store space is formed when said internal lining container is embedded in said external container and propped by said flange; and a temperature sensor device composed of a microprocessor, a temperature sensor, and a warning device, wherein said temperature sensor device is disposed in said store space and attached on an outside surface of a bottom end of said internal lining container for detecting temperature of food or soup loaded in said double-layer container; and, a detected signal is transmitted to said microprocessor to drive said warning device for keeping a user informed of temperature range of the food or the soup.

2. The double-layer container equipped with temperature warning device according to claim 1, wherein said warning device comprises a speaker and a plurality of LEDs in different colors for expressing different temperature ranges; and, a corresponding song or rhythm is played accompanying each lightened LED as a dual reminder of temperature range for a user.

3. The double-layer container equipped with temperature warning device according to claim 1, wherein a thermistor may serve for said temperature sensor.

* * * * *